United States Patent
Krone et al.

(10) Patent No.: US 11,292,502 B2
(45) Date of Patent: Apr. 5, 2022

(54) STEERING ASSEMBLY

(71) Applicant: Caterpillar Inc., Peoria, IL (US)

(72) Inventors: John James Krone, Peoria, IL (US); Kenneth Marvin Roat, Peoria, IL (US); Jeremy Todd Peterson, Washington, IL (US); Robert T. Cameron, Ellisville, IL (US); Jason Rex Dare, Peoria, IL (US); Micheal David Valerio, Morton, IL (US); Michael Weston Burns, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/786,168

(22) Filed: Feb. 10, 2020

(65) Prior Publication Data

US 2021/0245791 A1    Aug. 12, 2021

(51) Int. Cl.
*B62D 1/181*  (2006.01)
*B62D 1/184*  (2006.01)
*B62D 1/04*   (2006.01)
*B62D 1/187*  (2006.01)
*B62D 1/185*  (2006.01)

(52) U.S. Cl.
CPC .............. *B62D 1/181* (2013.01); *B62D 1/04* (2013.01); *B62D 1/184* (2013.01); *B62D 1/185* (2013.01); *B62D 1/187* (2013.01)

(58) Field of Classification Search
CPC .......... B62D 1/181; B62D 1/184; B62D 1/04; B62D 1/187; B62D 1/185
See application file for complete search history.

(56) References Cited

U.S. PATENT DOCUMENTS

| | | | |
|---|---|---|---|
| 4,819,498 A * | 4/1989 | Nishikawa | B62D 1/181 280/775 |
| 5,890,397 A * | 4/1999 | Stoner | B62D 1/18 74/493 |
| 6,053,274 A | 4/2000 | Ehara et al. | |
| 7,584,816 B2 | 9/2009 | Miyajima et al. | |
| 8,177,019 B2 | 5/2012 | Koyama et al. | |
| 8,589,029 B2 | 11/2013 | Svend | |
| 8,726,757 B2 * | 5/2014 | Barroso | B62D 1/187 74/493 |
| 9,150,242 B2 * | 10/2015 | Kjellestrom | B62D 1/183 |
| 9,669,861 B2 * | 6/2017 | Sedlmeier | B62D 1/184 |
| 9,771,101 B2 | 9/2017 | Hisanori | |
| 10,207,735 B2 | 2/2019 | Bebernes et al. | |
| 2014/0109715 A1 * | 4/2014 | Isaka | E02F 9/00 74/493 |
| 2017/0217473 A1 * | 8/2017 | Higashiguchi | B62D 1/10 |

(Continued)

FOREIGN PATENT DOCUMENTS

EP   3187395   7/2019

*Primary Examiner* — Drew J Brown
(74) *Attorney, Agent, or Firm* — Brannon Sowers and Cracraft PC

(57) ABSTRACT

A steering assembly for a machine is provided. The steering assembly includes a frame. The steering assembly also includes a steering column mounted on the frame. The steering column includes a steering input device and a controller communicably coupled to the steering input device. The steering assembly further includes a steering wheel operably coupled to the steering column. The steering wheel is disposed adjacent to the steering input device.

14 Claims, 6 Drawing Sheets

(56) References Cited

U.S. PATENT DOCUMENTS

| | | | |
|---|---|---|---|
| 2017/0217510 A1* | 8/2017 | Iwata | B62D 1/18 |
| 2019/0351936 A1 | 11/2019 | Anraku et al. | |
| 2020/0101998 A1* | 4/2020 | Nishimura | B62D 1/183 |
| 2020/0339179 A1* | 10/2020 | Nozawa | B62D 1/181 |
| 2021/0031822 A1* | 2/2021 | Watanabe | B62D 1/181 |
| 2021/0031823 A1* | 2/2021 | Watanabe | B62D 1/183 |
| 2021/0129891 A1* | 5/2021 | Ryne | B62D 1/185 |
| 2021/0129896 A1* | 5/2021 | Ryne | B62D 1/187 |

* cited by examiner

STEERING ASSEMBLY

TECHNICAL FIELD

The present disclosure relates to a steering assembly. More particularly, the present disclosure relates to the steering assembly for a machine.

BACKGROUND

Vehicles, such as construction machines, include a steering assembly provided in association with wheels of the vehicle in order to provide a desired steering of the wheels and maneuverability of the vehicle on ground. In many autonomous applications, the vehicle may include a dual steering system. The dual steering system may include a hydro-mechanical manual steering system and a path guided electronic steering system. In a semi-autonomous or an autonomous operating mode of the vehicle, the electronic steering system may be active and the manual steering system may be present, but non-functional. In a manual operating mode of the vehicle, the manual steering system may be active and the electronic steering system may be present, but non-functional. As such, the dual steering system provides redundant steering system, in turn, increasing complexity and costs. Hence, there is a need for an improved steering assembly for such applications.

U.S. Pat. No. 6,053,274 describes a cable-type steering device. Operation of a steering wheel is transmitted to a steering gear box through two cables. In the cable-type steering device, a steering torque inputted to the steering wheel is detected by a steering torque detector provided between the steering wheel and the cables. The operation of a motor for a power steering operation for driving the steering gear box is controlled based on the detected steering torque. The steering torque detected by the steering torque detector includes the friction of the cables and hence, a steering torque offsetting the friction of the cables can be generated in the motor for the power steering operation, thereby providing an appropriate steering feeling. A hydraulic power steering device may be used instead of or in addition to a motor for a power steering operation.

SUMMARY OF THE DISCLOSURE

In an aspect of the present disclosure, a steering assembly for a machine is provided. The steering assembly includes a frame. The steering assembly also includes a steering column mounted on the frame. The steering column includes a steering input device and a controller communicably coupled to the steering input device. The steering assembly further includes a steering wheel operably coupled to the steering column. The steering wheel is disposed adjacent to the steering input device.

In another aspect of the present disclosure, a machine is provided. The machine includes a chassis. The machine also includes a steering assembly mounted on the chassis. The steering assembly includes a frame. The steering assembly also includes a steering column mounted on the frame. The steering column includes a steering input device and a controller communicably coupled to the steering input device. The steering assembly further includes a steering wheel operably coupled to the steering column. The steering wheel is disposed adjacent to the steering input device.

Other features and aspects of this disclosure will be apparent from the following description and the accompanying drawings.

DETAILED DESCRIPTION

Figure 1A:
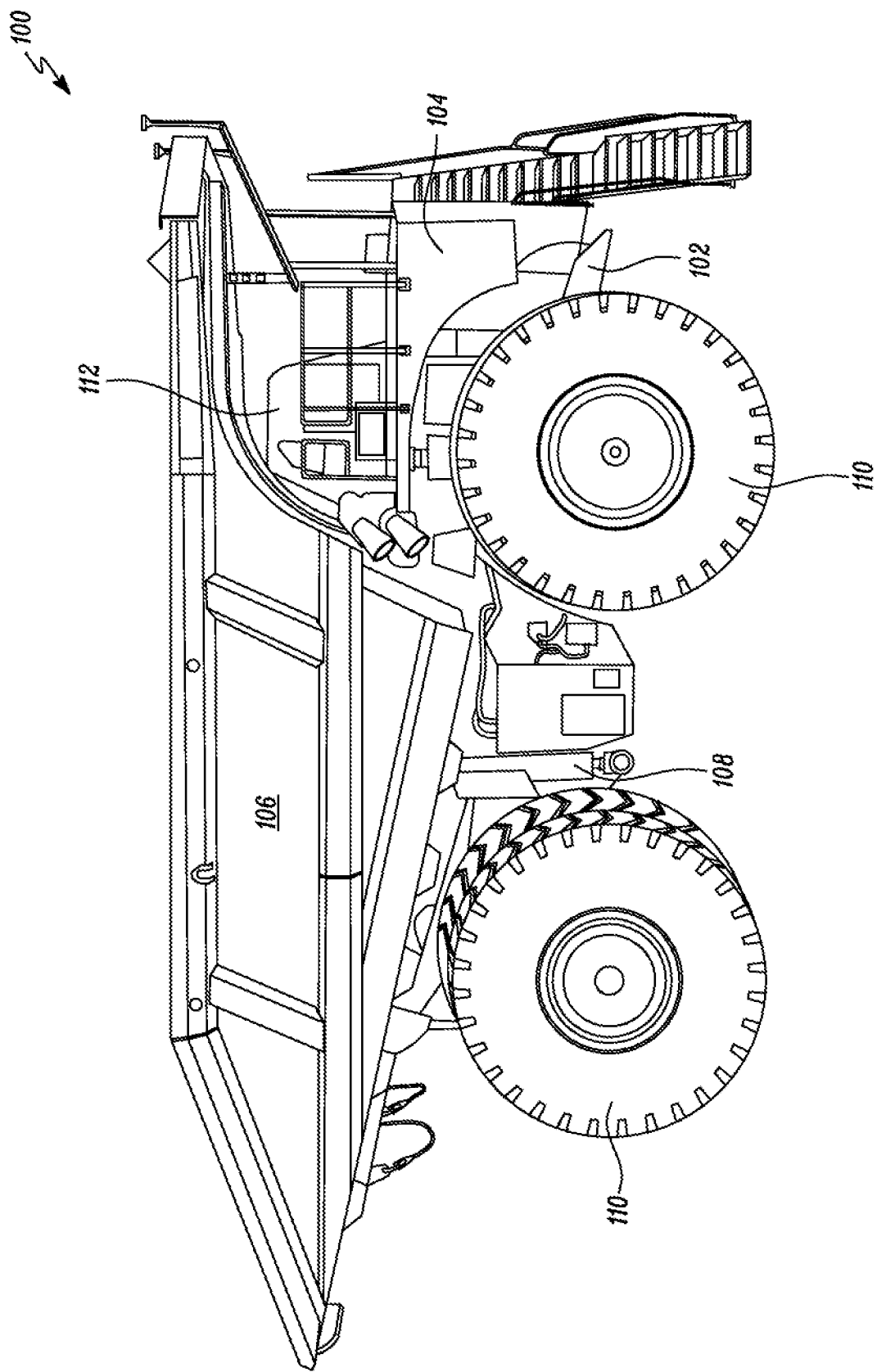
FIG. 1A is a side view of an exemplary machine.

Wherever possible, the same reference numbers will be used throughout the drawings to refer to the same or like parts. Referring to FIG. 1A, an exemplary machine 100 is illustrated. In the illustrated embodiment, the machine 100 is a mining truck. The machine 100 is adapted to transport material such as ore, soil, rocks, and so on from one location to another. In other embodiments, the machine 100 may be any other machine such as an off-highway truck, an underground mining truck, a haul truck, a dozer, a wheel loader, a wheel tractor scraper, and so on. The machine 100 may be any machine related to an industry including, but not limited to, construction, transportation, mining, material handling, aviation, marine, and waste management.

The machine 100 includes a chassis 102. The chassis 102 supports various components of the machine 100. The machine 100 includes an enclosure 104 provided on the chassis 102. The enclosure 104 houses a power source (not shown) of the machine 100. The power source provides power to the machine 100 for operational and mobility requirements. The power source may be any power source, such as an internal combustion engine, an electric motor, a battery, and so on. Additionally, the enclosure 104 may also include various components and systems (not shown) of the machine 100, such as an engine system, a transmission system, an electric drive system, a drive control system, an engine control system, a lubrication system, a cooling system, an air supply system, and so on.

The machine 100 includes a load bed 106 provided on the chassis 102. The load bed 106 is adapted to load and unload material therefrom for transporting the material from one location to another. The machine 100 also includes one or more hydraulic cylinders 108 coupled between the chassis 102 and the load bed 106. The hydraulic cylinders 108 tilt the load bed 106 during unloading of the material. The machine 100 also includes a set of ground wheels 110 rotatably mounted to the chassis 102. The ground wheels 110 support and provide mobility to the machine 100 on ground. It should be noted that the machine 100 may be an autonomous machine, a semi-autonomous machine, a remotely operated machine, a remotely supervised machine, a manually operated machine, and so on, based on application requirements.

The machine 100 also includes an operator cabin 112 mounted on the chassis 102. The operator cabin 112 houses one or more controls (not shown), such as a pedal, a lever, a control console, buttons, knobs, audio visual system, alarm system, and so on. The controls are adapted to operate and control the machine 100 on the ground. Additionally, the operator cabin 112 also includes an operator seat 202 (shown in FIG. 2) and a steering assembly 204 (shown in FIG. 2) mounted on the chassis 102. The operator seat 202 provides a seating surface for an operator (not shown) present in the operator cabin 112. The steering assembly 204 is adapted to maneuver the machine 100 on the ground.

Figure 1B:
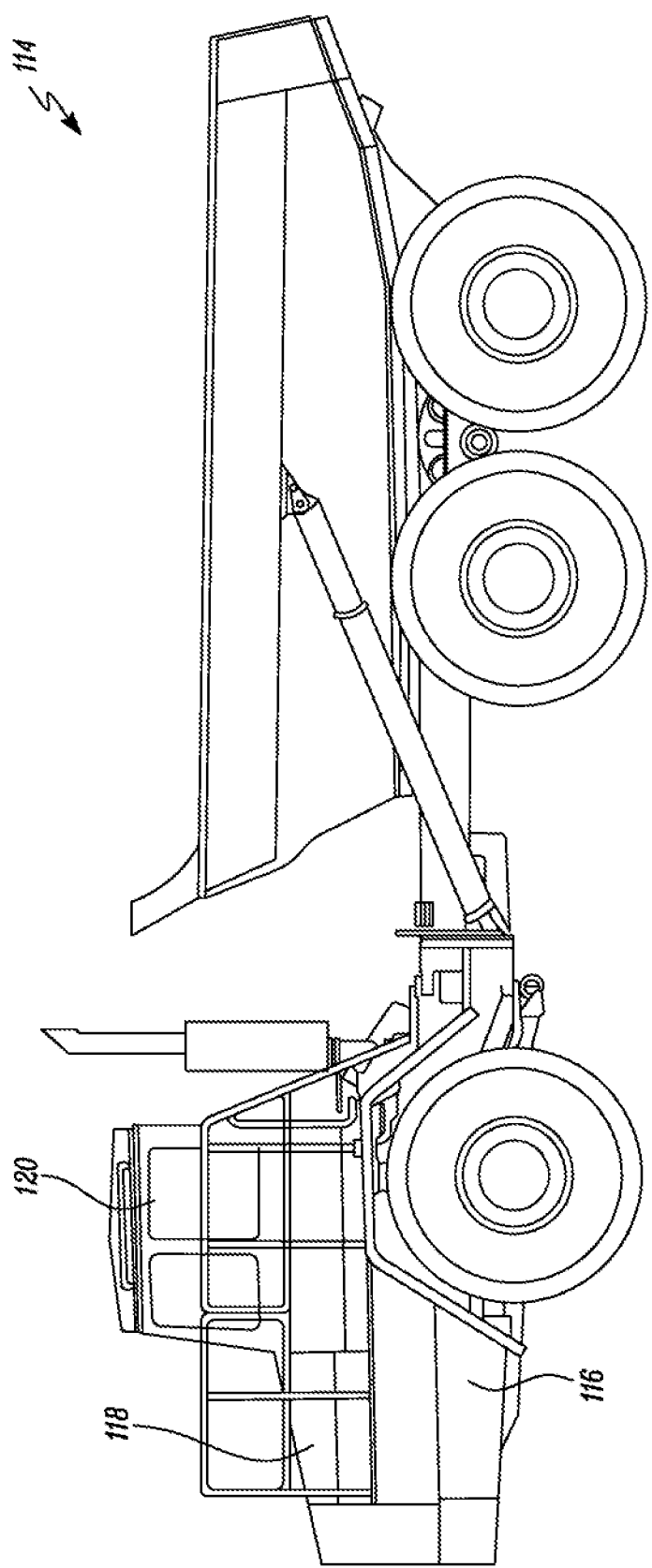
FIG. 1B is a side view of another exemplary machine.

FIG. 1B illustrates another machine 114, according to an embodiment of the present disclosure. The machine 114 is embodied as an articulated truck. The machine 114 includes a chassis 116 similar to the chassis 102 (see FIG. 1A), an enclosure 118 similar to the enclosure 104 (see FIG. 1A) for housing an engine (not shown), and an operator cabin 120 mounted on the chassis 116. The operator cabin 120 includes an operator seat (not shown) and a steering assembly (not shown) mounted on the chassis 116. The steering assembly is adapted to maneuver the machine 114 on grounds. The steering assembly of the machine 114 is similar to the steering assembly 204 (see FIG. 2) associated with the machine 100 (see FIG. 1A).

For exemplary purposes, the steering assembly 204 associated with the machine 100 will now be explained in detail. However, it should be noted that the description provided below is equally applicable to the steering assembly associated with the machine 114, without limiting the scope of the present disclosure.

Figure 2:
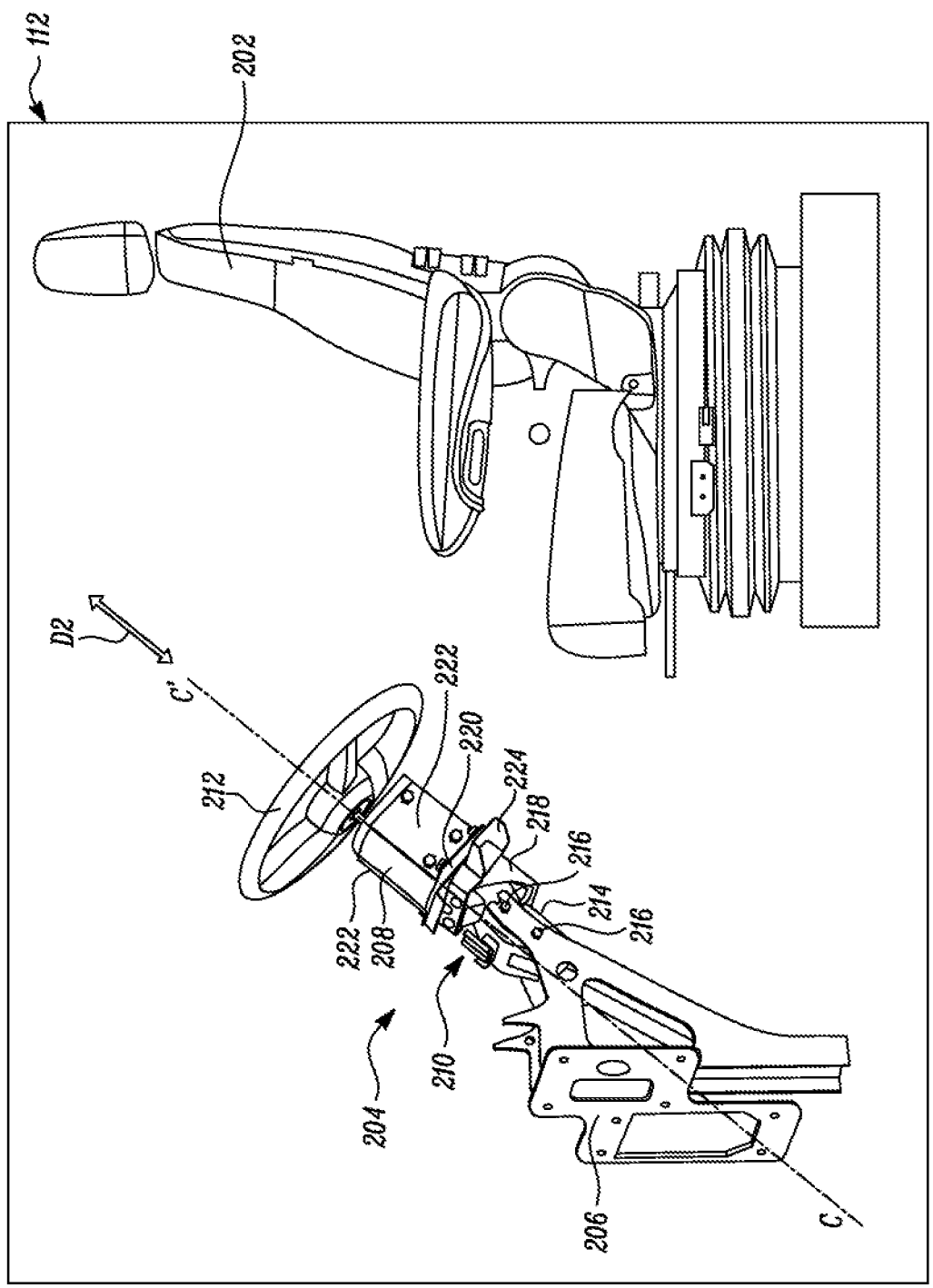
FIG. 2 is a perspective view of an exemplary operator cabin of the machine of FIG. 1A, according to one embodiment of the present disclosure.
Figure 3:
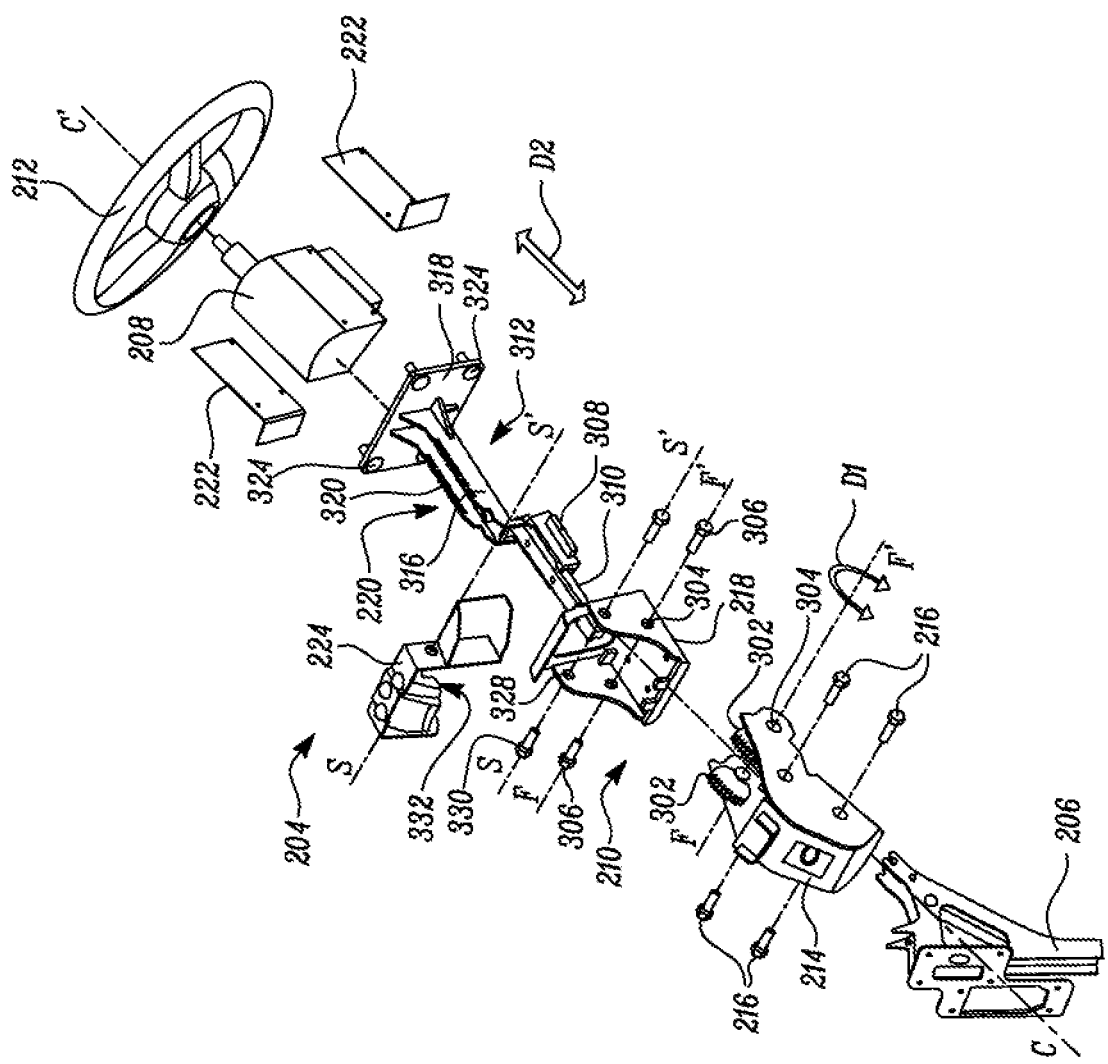
FIG. 3 is an exploded perspective view of a steering assembly of the machine of FIG. 1A, according to one embodiment of the present disclosure.

Referring to FIGS. 2 and 3, an assembled view and an exploded view of the steering assembly 204 is illustrated, respectively. The steering assembly 204 will be hereinafter interchangeably referred to as the "assembly 204". The assembly 204 will now be explained with combined reference to FIGS. 2 and 3. The assembly 204 includes a frame 206 mounted on the chassis 102. In one embodiment, the frame 206 may have a single unit structure. In other embodiments, the frame 206 may have a multi-unit structure. The frame 206 may be made of any material, such as a metal, an alloy, a polymer, a combination thereof and so on. Also, the frame 206 may be manufactured using any process, such as casting, fabrication, molding, additive manufacturing, and so on.

The assembly 204 also includes a steering column 208. The steering column 208 will be hereinafter interchangeably referred to as the "column 208". The column 208 is mounted on the frame 206. In the illustrated embodiment, the column 208 is mounted on the frame 206 using an adjustment mechanism 210. The adjustment mechanism 210 will be hereinafter interchangeably referred to as the "adjuster 210". In other embodiments, the column 208 may be directly mounted on the frame 206, such that the adjuster 210 may be omitted.

In an example, the column 208 redundantly measures a steering input provided via a steering wheel 212. The column 208 has rotational stops (not shown) for limiting a rotation of the column 208 in a clockwise direction or an anti-clockwise direction. Further, the column 208 includes an electric motor or an electric device that is electronically controlled to provide a tactical or haptic steering feedback to the operator through the steering wheel 212.

The tactical or haptic steering feedback provided by the column 208 may include, for example, higher steering resistance with increased rotation of the steering wheel 212, higher steering resistance at increased ground speed, higher steering resistance as the steering wheel 212 approaches the rotational stops, low notch resistance when the machine 100 is moving in a forward direction, vibration when the machine 100 approaches a predetermined boundary, and the like.

The assembly 204 also includes the steering wheel 212. The steering wheel 212 will be hereinafter interchangeably referred to as the "wheel 212". The wheel 212 is operably coupled to the column 208. Further, the assembly 204 also includes a first steering Electronic Control Unit (ECU) 205 and a second steering ECU 207. The first and second steering ECUs 205, 207 may be disposed between the mechanism 408 and the controller 406. The first and second steering ECUs 205, 207 may receive values corresponding to input signals received via the wheel 212, actual steer angle feedback, steering value spool position, steering pressure, and the like. In some examples, the first and second steering ECUs 205, 207 may also receive values corresponding to engine speed, ground speed of the machine 100, transmission gear position, secondary steering status, operator presence, pitch, yaw, or roll of the machine 100, machine payload, traction control, and the like.

Figure 4:
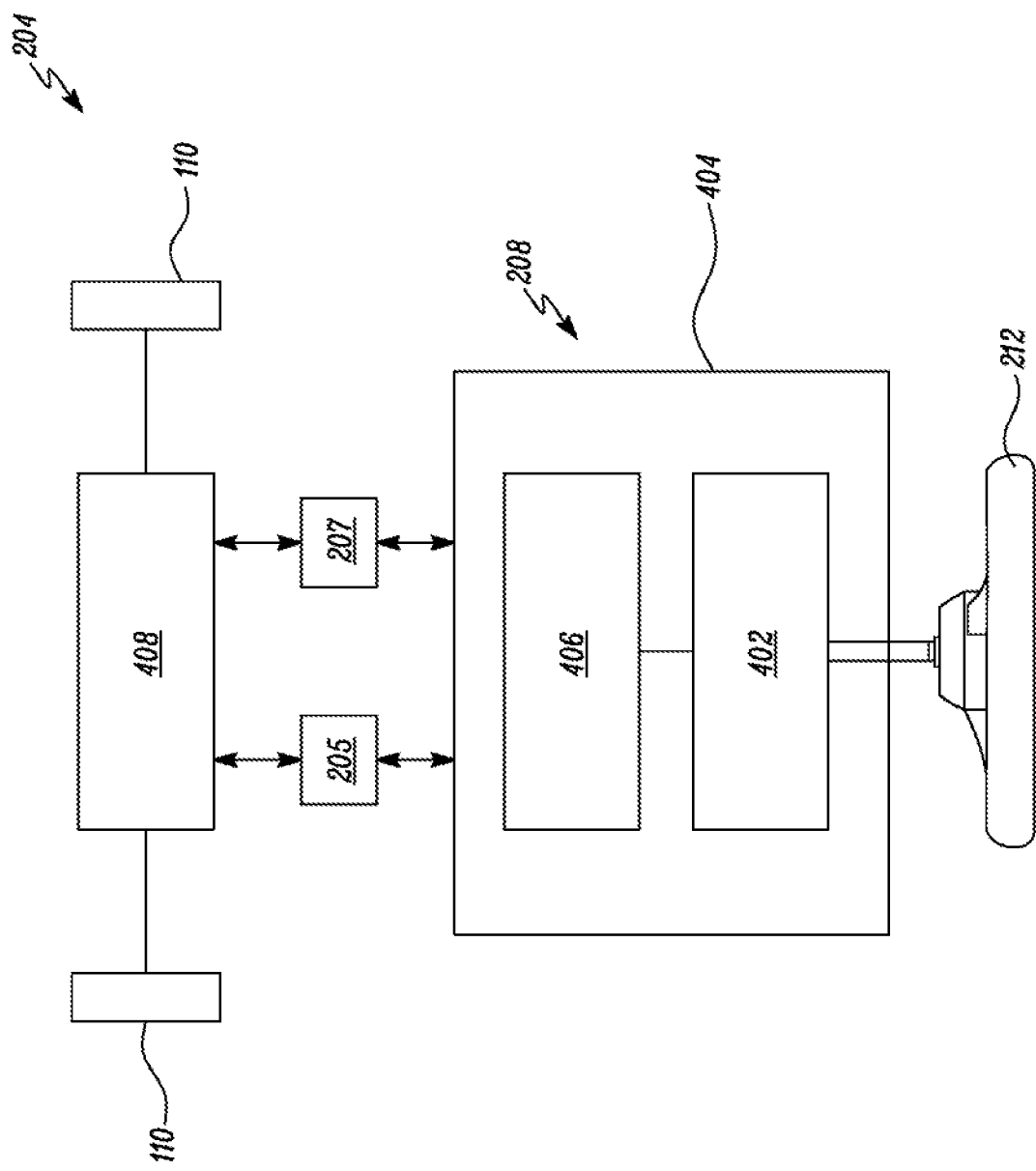
FIG. 4 is a schematic representation of a portion of the steering assembly of FIG. 3, according to one embodiment of the present disclosure.

Referring to FIG. 4, a schematic representation of a portion of the assembly 204 is illustrated. As shown in the accompanying figure, the column 208 includes a Steering Input Device (SID) 402. The steering input device 402 will be hereinafter interchangeably referred to as the "SID 402" The SID 402 is disposed within a housing 404 of the column 208. The SID 402 is directly coupled to the wheel 212. The SID 402 directly supports the wheel 212 via a shaft on bearing arrangement (not shown) that is provided within the SID 402. Accordingly, the wheel 212 is disposed adjacent to the SID 402. In a manual mode of the machine 100, the SID 402 is configured to receive the steering input from the operator via the wheel 212. Further, the SID 402 is configured to generate a signal indicative of a magnitude of the steering input. The SID 402 may be any known electronic steering input unit and may include other elements (not shown), such as one or more rotation sensors, torque sensors, rotation stops, an electric motor, a control unit, and so on, based on application requirements.

Further, if the operator wants to take control of the machine 100, the SID 402 allows switching of the machine 100 from an autonomous mode to the manual mode based on grasping of the wheel 212 by the operator. More particularly, the SID 402 allows switching of the machine 100 from the autonomous mode to the manual mode based on sensing of a misalignment between the steering input received from the operator via the wheel 212 and an autonomous steering path signal. Further, once the machine 100 switches to the manual mode, the machine 100 can be switched back to the autonomous mode when the machine 100 is fully stopped and an autonomous start-up sequence is completed. Moreover, when the machine 100 is in the manual mode during machine start-up, the SID 402 compares the position of the wheel 212 with the actual steer angle. If the position of the wheel 212 is not in alignment with the actual steer angle, the SID 402 sends out a signal to rotate the wheel 212 so that the position of the wheel 212 corresponds to the actual steer angle to allow machine operation.

The column 208 also includes a controller 406. The controller 406 may be any control unit configured to perform various functions of a steering system. In one embodiment, the controller 406 may be a dedicated control unit configured to perform functions related to the steering system. In another embodiment, the controller 406 may be a Machine Control Unit (MCU) associated with the machine 100, an Engine Control Unit associated with the engine, and so on configured to perform functions related to the steering system. The controller 406 is communicably coupled to the SID 402 and a steering mechanism 408. The steering mechanism 408 will be hereinafter interchangeably referred to as the "mechanism 408".

Accordingly, in the manual mode of the machine 100, the controller 406 is configured to receive the signal indicative of the magnitude of the steering input from the SID 402. Based on the received signal, the controller 406 is configured to actuate and/or control the mechanism 408 in order to steer the ground wheels 110. Additionally, the controller 406 is configured to measure an actual steer angle of the ground wheels 110 and compare the actual steer angle of the ground wheels 110 with the steering input. Further, the controller 406 is configured to actuate and/or control the mechanism 408 until the actual steer angle of the ground wheels 110 is equal to the steering input. In one embodiment, the mechanism 408 may be a hydraulic type steering mechanism. In other embodiments, the mechanism 408 may be an electronic/electrical type steering mechanism.

In a semi-autonomous mode of the machine 100, the controller 406 may be configured to augment the steering input received from the wheel 212 and the SID 402. Also, in the semi-autonomous mode and/or an autonomous mode of the machine 100, the controller 406 is configured to receive a signal indicative of a desired steering of the machine 100 from an autonomous control system (not shown), such as a path guidance system, associated with the machine 100 and communicably coupled to the controller 406. Based on the received signal, the controller 406 is configured to actuate and/or control the mechanism 408 in order to steer the ground wheels 110. In such a situation, the controller 406 is also configured to actuate and/or control the SID 402 in order to align the wheel 212 relative to the actual steer angle of the ground wheels 110. Further, in some examples, the actual steer angle feedback in the form of a semi-autonomous or autonomous signal is sent to the first and second steering ECUs 205, 207 to ensure alignment of the wheel 212 with the actual machine steer angle, without any limitations.

Referring back to FIGS. 2 and 3, the assembly 204 also includes the adjuster 210. The adjuster 210 is disposed between the frame 206 and the column 208. The adjuster 210 includes a mounting bracket 214. The mounting bracket 214 defines a central axis C-C'. The mounting bracket 214 is fixedly coupled to the frame 206 using one or more fasteners 216, such as screws, nuts, bolts, pins, and so on. Additionally, the mounting bracket 214 includes several first teeth 302. The first teeth 302 will be explained in more detail later. The mounting bracket 214 may be made of any material, such as a metal, an alloy, a polymer, a combination thereof, and so on. Also, the mounting bracket 214 may be manufactured using any process, such as casting, fabrication, molding, additive manufacturing, and so on.

The adjuster 210 also includes a pivoting bracket 218. The pivoting bracket 218 is movably coupled to the mounting bracket 214 using a first pivot joint 304. The first pivot joint 304 defines a first pivot axis F-F'. Accordingly, the pivoting bracket 218 is adapted to selectively pivot about the first pivot joint 304 and the first pivot axis F-F' relative to the mounting bracket 214. The pivoting bracket 218 may be movably coupled to the mounting bracket 214 at the first pivot joint 304 using any fastener 306, such as a pin, and so on. The pivoting bracket 218 may be made of any material, such as a metal, an alloy, a polymer, a combination thereof, and so on. Also, the pivoting bracket 218 may be manufactured using any process, such as casting, fabrication, molding, additive manufacturing, and so on.

The adjuster 210 also includes a telescoping bracket 220. The telescoping bracket 220 is movably coupled to the pivoting bracket 218. More specifically, the telescoping bracket 220 includes a base portion 308, a guide portion 310, and a mounting portion 312. The base portion 308 is fixedly coupled to the pivoting bracket 218 using one or more fasteners (not shown), such as screws, bolts, nuts, pins, and so on. The guide portion 310 is slidably coupled to the base portion 308. The guide portion 310 has a substantially elongated configuration. As such, the guide portion 310 is adapted to selectively move relative to the base portion 308 along the central axis C-C'. Accordingly, the telescoping bracket 220 is adapted to selectively move relative to the pivoting bracket 218 along the central axis C-C'. In this example, the mounting portion 312 is fixedly coupled to the guide portion 310 using mechanical fasteners, such as bolts, screws, pins, and the like. In other examples, the mounting portion 312 may be fixedly coupled to the guide portion 310 by other joining methods, such as by welding, and so on. In some embodiments, the mounting portion 312 may be integrally manufactured with the guide portion 310.

The mounting portion 312 includes a rack portion 316 and a base plate 318. The rack portion 316 is coupled to the guide portion 310. The base plate 318 is coupled to the rack portion 316. The rack portion 316 includes several second teeth 320. The second teeth 320 will be explained in more detail later. The base plate 318 is adapted to removably receive the column 208 on the telescoping bracket 220. The telescoping bracket 220 may be made of any material, such as a metal, an alloy, a polymer, a combination thereof, and so on. Also, the telescoping bracket 220 may be manufactured using any process, such as casting, fabrication, molding, additive manufacturing, and so on.

In the illustrated embodiment, the adjuster 210 further includes one or more mounting plates 222. The mounting plates 222 are removably coupled to the base plate 318 of the telescoping bracket 220 using one or more fasteners 324, such as screws, bolts, nuts, pins, and so on. The mounting plates 222 are adapted to removably mount the column 208 on the telescoping bracket 220. The column 208 may be removably coupled to the mounting plates 222 using any fasteners (not shown), such as screws, bolts, nuts, pins, and so on. In some embodiments, the column 208 may be directly mounted on the base plate 318 of the telescoping bracket 220. In such a situation, the mounting plates 222 may be omitted.

The adjuster 210 further includes a locking member 224. The locking member 224 is movably coupled to the pivoting bracket 218 using a second pivot joint 328. The second pivot joint 328 defines a second pivot axis S-S'. Accordingly, the locking member 224 is adapted to selectively pivot about the second pivot joint 328 and the second pivot axis S-S' relative to the pivoting bracket 218 in a disengaged position and an engaged position. The locking member 224 may be movably coupled to the pivoting bracket 218 at the second pivot joint 328 using any fastener 330, such as a pin, and so on. The locking member 224 includes a number of locking teeth 332. As such, the locking member 224 is adapted to selective engage with each of the first teeth 302 and the second teeth 320. The locking member 224 may be made of any material, such as a metal, an alloy, a polymer, a combination thereof, and so on. Also, the locking member 224 may be manufactured using any process, such as casting, fabrication, molding, additive manufacturing, and so on.

More specifically, in the disengaged position of the locking member 224, the locking teeth 332 of the locking member 224 disengage with each of the first teeth 302 of the mounting bracket 214 and each of the second teeth 320 of the telescoping bracket 220. As such, the pivoting bracket 218 may pivot about the first pivot joint 304 and the first pivot axis F-F' relative to the mounting bracket 214 in order to move each of the telescoping bracket 220, the mounting plates 222, the locking member 224, the column 208, and the wheel 212 in a direction "D1" (shown in FIG. 3).

Also, the telescoping bracket 220 may slide relative to the pivoting bracket 218 along the central axis C-C' in order to move each of the telescoping bracket 220, the mounting plates 222, the locking member 224, the column 208, and the wheel 212 in a direction "D2". Further, in the engaged position of the locking member 224, the locking teeth 332 of the locking member 224 engage with each of the first teeth 302 of the mounting bracket 214 and each of the second teeth 320 of the telescoping bracket 220 in order to secure the wheel 212 in a desired operating position. As such, in the engaged position of the locking member 224, movement of the wheel 212 in each of the directions "D1", "D2" is limited.

Figure 5:
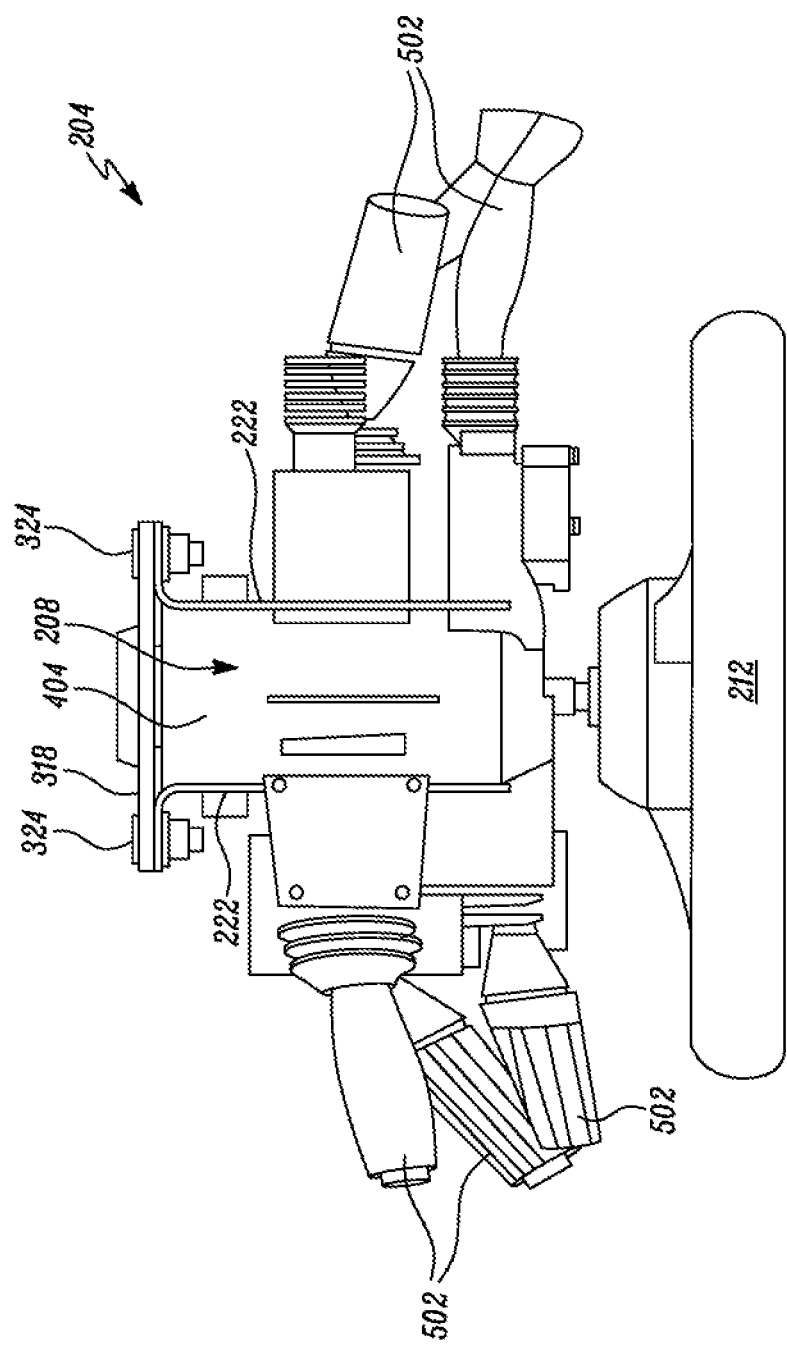
FIG. 5 is a top view of a portion of the steering assembly of FIG. 3, according to one embodiment of the present disclosure.

Referring to FIG. 5, a top view of a portion of the assembly 204 is illustrated. It should be noted that several components of the assembly 204 are omitted in the accompanying figure for purpose of explanation and clarity. The assembly 204 also includes several control stalks 502. In the illustrated embodiment, the control stalks 502 are coupled to the mounting plates 222. In other embodiments, the control stalks 502 may be directly coupled to the column 208. In such a situation, the mounting plates 222 may be omitted. Also, the control stalks 502 are disposed adjacent to the column 208. The control stalks 502 are adapted to control one or more elements (not shown) associated with the machine 100, such as windshield wipers, windshield fluid, headlights, indicator lights, drive control modes, engine operating modes, machine operating modes, transmission shift, retarding controls, and so on, based on application requirements.

INDUSTRIAL APPLICABILITY

The present disclosure is related to the assembly 204 and positioning of the column 208 relative to the wheel 212. The assembly 204 provides a simple, efficient, fail-safe, and cost-effective method to provide a manual, a semi-automated, and/or an automated steering control using the assembly 204. The assembly 204 described herein can be incorporated in an Ackerman steering linkage system associated with mining trucks or an articulation steering linkage system associated with articulated trucks, without any limitations.

In the manual, the semi-autonomous, and/or the autonomous mode of the machine 100, the SID 402 coupled to the wheel 212 may include rotation stops and may provide a haptic steering feedback to the operator, in turn, improving usability and operability. The haptic steering feedback may provide variable steering resistance of the wheel 212 based on rotating speed of the wheel 212 by the operator, ground speed of the machine 100, modulation zones, predefined operating/hazardous conditions, difference between the steering input and the actual steer angle of the ground wheels 110, and so on. It should be noted that the haptic feedback from the SID 402 is such that the operator can override the haptic feedback. Thus, the SID 402 is designed to follow the steering input even if the haptic feedback is being overridden by the operator.

Further, the SID 402 also allows switching of the machine 100 from the autonomous mode to the manual mode. Moreover, when the machine 100 is in the manual mode during machine start-up, the SID 402 sends out the signal to align the wheel 212 with the actual steer angle to allow machine operation. In the semi-autonomous and/or the autonomous mode of the machine 100, the SID 402 may align the wheel 212 relative to the actual steer angle of the ground wheels 110, in turn, providing switching from the autonomous steering control to the manual steering control while the machine 100 may be in motion.

The SID 402 provides a rotational range of the wheel 212 independent of the steering mechanism 408. More specifically, the SID 402 provides a reduced rotational range, such as less than 360 degrees, of the wheel 212 for a complete angular range of the steering mechanism 408. As such, the reduced rotational range of the wheel 212 reduces tracking issues in rotation software, limits redundant use of rotation sensors, reduces need for wire routing for 360 degrees rotation, reduces labor effort during operation of the wheel 212, limits need for accessories, such as steering wheel spinners, and so on. Further, reduction in the rotational range may allow easy integration of rotation switches, toggles, or control pad into the steering wheel 212 for operator control of display of the machine 100, radio, control features, and the like. Thus, such features may be accessed by the operator without having to remove their hands from the steering wheel 212, thereby improving ergonomics and operator comfort.

The assembly 204 provides a direct connection between the wheel 212 and the SID 402 to control a quality as well as degree of freedom of the steering wheel 212. This direct connection in turn, reduces mechanical dead band, hysteresis, friction/drag, shaft cogging, universal joint cogging, backlash of spline joints, misalignment of the wheel 212 relative to the ground wheels 110, other mechanical disturbances, improving operator steering input and haptic steering feedback, and so on.

The control stalks 502 are mounted on the column 208, in turn, providing movement of the control stalks 502 with the wheel 212 during adjustment, providing constant relative position between the wheel 212 and the control stalks 502, providing clear line of sight to control stalk icons and a dashboard information display (not shown) through the wheel 212, and so on. The assembly 204 includes limited mechanical and/or hydraulic components disposed within the operator cabin 112, in turn, improving noise attenuation, improving protection from environmental factors, and improving service life of the assembly 204. Also, the assembly 204 has a limited footprint within the operator cabin 112, in turn, improving legroom for the operator. Further, the assembly 204 has no components mounted externally on the operator cabin 112, in turn, reducing complexity and costs.

The adjuster 210 provides a single lever based tilt and telescopic adjustment of the wheel 212 using the locking member 224, in turn, improving ergonomics for the operator. The wheel 212 may have neutral buoyancy when making ergonomic adjustments, in turn, improving usability and operability. Further, the locking member 224 may automatically engage as the operator may release the locking member 224 and may provide a positive engagement of the locking member 224, in turn, limiting disengagement during rough terrain operation. Additionally, the adjuster 210 may include bump stops at extreme adjustment ranges, in turn, providing an intuitive operation of the adjuster 210 for the operator. The assembly 204 may be retrofitted in any operator cabin/machine with little or no modification to existing operator cabin/machine, in turn, improving flexibility, improving compatibility, increasing volumes, increasing standardization and consistency across product lines, reducing tooling modifications, reducing costs, and so on.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A steering assembly for a machine, the steering assembly comprising:
   a frame;
   a steering column mounted on the frame, the steering column including:
      a steering input device;
      a controller communicably coupled to the steering input device; and
      a steering wheel operably coupled to the steering column, wherein the steering wheel is disposed adjacent to the steering input device and the steering input device is configured to receive a steering input provided by way of rotation of the steering wheel;
   a central axis extends through the steering wheel, the steering column, and the frame; and
   an adjustment mechanism disposed axially between the frame and the steering input device, and including a pivoting bracket and a telescoping bracket adapted to pivot and telescope, respectively, the steering column relative to the frame.

2. The steering assembly of claim 1, wherein the adjustment mechanism further includes a mounting bracket fixedly coupled to the frame, the mounting bracket defining a central axis.

3. The steering assembly of claim 2, wherein the pivoting bracket is coupled to the mounting bracket, the pivoting bracket adapted to selectively pivot about a pivot axis relative to the mounting bracket.

4. The steering assembly of claim 3, wherein the telescoping bracket is coupled to the pivoting bracket, the telescoping bracket adapted to selectively move relative to the pivoting bracket along the central axis.

5. The steering assembly of claim 4, wherein the steering column is mounted on the telescoping bracket using at least one mounting plate.

6. The steering assembly of claim 5 further includes a plurality of control stalks coupled to the at least one mounting plate and disposed adjacent to the steering column.

7. A steering assembly of for a machine, the steering assembly comprising:
   a frame;
   a steering column mounted on the frame, the steering column including:
      a steering input device;
      a controller communicably coupled to the steering input device; and
      a steering wheel operably coupled to the steering column, wherein the steering wheel is disposed adjacent to the steering input device;
   an adjustment mechanism disposed between the frame and the steering column, the adjustment mechanism including:
      a mounting bracket fixedly coupled to the frame, the mounting bracket defining a central axis
      a pivoting bracket coupled to the mounting bracket, the pivoting bracket adapted to selectively pivot about a pivot axis relative to the mounting bracket; and
      a telescoping bracket coupled to the pivoting bracket, the telescoping bracket adapted to selectively move relative to the pivoting bracket along the central axis;
   wherein the mounting bracket further includes a plurality of first teeth.

8. The steering assembly of claim 7, wherein the telescoping bracket further includes a plurality of second teeth.

9. The steering assembly of claim 8, wherein the adjustment mechanism further includes a locking member coupled to the pivoting bracket, the locking member adapted to selective engage with each of the plurality of first teeth and the plurality of second teeth.

10. A machine comprising:
    a chassis; and
    a steering assembly mounted on the chassis, the steering assembly including:
    a frame;
    a steering column mounted on the frame, the steering column including:
       a steering input device;
       a controller communicably coupled to the steering input device; and
       a steering wheel operably coupled to the steering column, wherein the steering wheel is disposed adjacent to the steering input device;
    a mounting bracket fixedly coupled to the frame and defining a central axis;
    a pivoting bracket coupled to the mounting bracket and adapted to selectively pivot about a pivot axis relative to the mounting bracket; and
    a telescoping bracket coupled to the pivoting bracket, the telescoping bracket adapted to selectively move relative to the pivoting bracket along the central axis; and
    the mounting bracket further including a plurality of first teeth.

11. The machine of claim 10, wherein the telescoping bracket further includes a plurality of second teeth.

12. The machine of claim 11, further including a locking member coupled to the pivoting bracket, the locking member adapted to selective engage with each of the plurality of first teeth and the plurality of second teeth.

13. The machine of claim 10, wherein the steering column is mounted on the telescoping bracket using at least one mounting plate.

14. The machine of claim 13 further includes a plurality of control stalks coupled to the at least one mounting plate and disposed adjacent to the steering column.

* * * * *